(12) United States Patent
Lange et al.

(10) Patent No.: US 6,475,959 B1
(45) Date of Patent: Nov. 5, 2002

(54) METHOD FOR THE RHEOLOGY CONTROL OF FLUID PHASES

(75) Inventors: Peter Lange, Obing (DE); Gregor Keilhofer, Tacherting (DE); Johann Plank, Trostberg (DE)

(73) Assignee: SKW Polymers GmbH, Trostberg (DE)

( * ) Notice: Subject to any disclaimer, the term of this patent is extended or adjusted under 35 U.S.C. 154(b) by 124 days.

(21) Appl. No.: 09/616,657

(22) Filed: Jul. 14, 2000

(30) Foreign Application Priority Data

Jul. 15, 1999 (DE) .......................... 199 33 176

(51) Int. Cl.⁷ .............................. C09K 7/00; B01J 13/00
(52) U.S. Cl. ...................... 507/140; 507/904; 516/110; 252/184
(58) Field of Search .......................... 516/110; 507/140, 507/904; 252/184

(56) References Cited

U.S. PATENT DOCUMENTS

| 4,664,843 A | * | 5/1987 | Burba, III et al. | .......... 507/140 |
|---|---|---|---|---|
| 5,094,778 A | * | 3/1992 | Burba, III et al. | .......... 507/140 |
| 5,232,627 A | * | 8/1993 | Burba, III et al. | .......... 507/140 |
| 5,663,122 A | * | 9/1997 | Mueller et al. | ............. 507/140 |
| 5,821,203 A | * | 10/1998 | Williamson | ................. 507/140 |
| 6,025,303 A | * | 2/2000 | Keilhofer et al. | ............ 507/140 |
| 6,279,655 B1 | * | 8/2001 | Pafitis et al. | ................ 166/294 |

* cited by examiner

*Primary Examiner*—Philip Tucker
(74) *Attorney, Agent, or Firm*—Fulbright & Jaworski L.L.P.

(57) ABSTRACT

A method for the rheology control of fluid phases, in which adducts which contain layered mixed metal hydroxides (MMH) and hectorite are used, and corresponding compositions for this purpose are claimed. Preferably used MMH are those which were produced by hydration of mixed metal oxides or oxyhydroxides, which in turn may be thermally activated. The use of coprecipitated MMH or of MMH produced in situ is also possible. The ratio of MMH to the hectorite component should preferably be from 0.05 to 0.2:1, it also being possible to use adducts whose clay fraction contains up to 80%. by weight of clays differing from hectorite, in particular bentonite. The method is preferably carried out using drilling fluids in the high-temperature range >300° F. (>149° C.).

20 Claims, No Drawings

METHOD FOR THE RHEOLOGY CONTROL OF FLUID PHASES

The present invention relates to a method for the rheology control of fluid phases and a suitable composition for this purpose.

The thickening of water- and oil-based systems, so-called rheology control, is carried out in practice especially with the aid of finely divided swellable clays and/or other silicate compounds of natural or synthetic origin. The various fields of work make use of the possibility, existing here, of the shear-thinning and/or thixotropic thickening of the respective fluid phases.

In particular, adducts of mixed metal hydroxides and clay have been widely described in the past and are popular in practice. The individual mixed metal hydroxide types each thicken the initially introduced clay suspension, with the result that pronounced shear-thinning rheology is obtained.

Mixed metal oxides ("MMH") or layered double hydroxides ("LDH") are a class of substances comprising clay-like minerals of the general empirical formula $$[M^{II}_{1-x}M^{III}_x(OH)_2](A^n)_{-x/n}$$

Here, $M^{II}$ and $M^{III}$ are divalent or trivalent metal cations and A is any desired anion. A further designation, namely "HTC-type minerals", is derived from the most well-known member, hydrotalcite, an Mg—Al-carbonate-MMH.

The preparation of MMH compounds by coprecipitation and their use as thickeners are described, for example, in the patent documents European Patent 207 801 and European Patent 207 811. Accordingly, an Mg Al hydroxychloride MMH having the composition $MgAl(OH)_{5-x}Cl_x$ is obtained, for example, by precipitation of $MgCl_2$ with $AlCl_3$ in the presence of a base.

Owing to the various disadvantages of this coprecipitated MMH product, such as, for example, high production costs and the necessity of a dispersant, an improved material in the form of the activated, hydrated mixed metal oxide (AHMMO) was made available to the user. A mixed metal oxide or mixed metal oxyhydroxide of the general empirical formula $$Mg_{1-x}Al_x(O)_y(OH)_z$$

is obtained by thermal activation of, for example, hydrotalcite. The activation process, optimized with respect to the thickening effect, results in the compound additionally containing smaller residual amounts of carbonate and water of hydration. The commercial product thus obtained is a highly effective MMH concentrate. If this product is added to water, it undergoes hydration with formation of Mg—Al—OH-MMH (AHMMO). This MMH species having mobile hydroxide moieties instead of carbonate is suitable, according to European Patent 539 582, as a thickener for aqueous clay suspensions. In contrast to the coprecipitated MMH, the AHMMO is chloride-free, requires no additional dispersant and can be prepared in a more economical and environmentally compatible manner.

According to European Patent 617 106, however, mixtures of, for example, sodium aluminate and magnesium oxide also act as thickeners in aqueous clay suspensions. As various analytical methods, in particular X-ray diffraction, have shown, Mg—Al—OH-MMH according to the empirical formula presented at the outset form here again in situ.

In addition to these MMH or LDH types having a layer structure, the mixed metal hydroxides having a three-dimensional network structure are also used for thickening aqueous clay suspensions. In WO 94/02 566, katoites having the basic formula $$Ca_3Al_2(OH)_{12}$$

in which some of the OH groups are replaced by silicate radicals, are mentioned as being preferred for this purpose. Such MMH compounds are also known under the name mixed metal silicates (MMS). However, some MMS/clay drilling fluids have a substantially lower thermal stability than MMH/clay-based fluids.

The Theological properties of MMH/clay-based drilling fluids are very valuable in particular for drilling technology. Auxiliary fluids thickened to a shear-thinning viscosity of a greater or lesser extent are preferably used in the technology of geological and other drilling operations in the earth, but also, for example, as an earth support in excavations, in particular in subterrain curtain construction, in the sinking of shafts, wells and caissons, in pipe forcing, etc. Particularly important fields of use are wells for petroleum or natural gas exploration and horizontal drilling for trenchless pipe construction.

Drilling fluid systems which are sufficiently thickened by the addition of mineral viscosifiers without losing their flowability and pumpability under shearing stress and which contain additional dissolved, emulsified and/or suspended assistants adapted to the respective situation are widely used.

The high carrying capacity of MMH/clay fluids has proven its worth especially in large-caliber wells, when milling out damaged casing, in horizontal drilling and in drilling through coarse gravel. In particular, stuck-pipe problems by the settling of drill cuttings are prevented. In addition, the drilling fluid should be of low viscosity and readily pumpable at points of higher shearing stress, such as, for example, on emergence from the drill bit. For rapid advance of the drilling, a reduction in viscosity, which is high at rest, with growing shear gradient is required. This type of flow behavior is generally referred to as shear-thinnings.

MMH/clay-based drilling fluids have such a rheology. In contrast to biopolymers having also a shear-thinning effect, such as, for example, xanthan gum, crosslinking with bentonite, a smectite clay, usually used in drilling technology takes place when MMH is used. This cooperation of MMH with bentonite in the common network results in extreme shear-thinning fluid properties at relatively low costs in comparison with the biopolymer drilling fluids. The latter must in fact generate the desired rheology completely by themselves, for which purpose substantially higher doses are required.

According to Bingham, the rheology of a drilling fluid can be described by the yield point (YP[lbs/100 ft$^2$]) and the plastic viscosity (PV[cP]). These parameters can be determined by measuring the shear stress in a rotational viscometer (e.g. FANN 35 from Baroid, Houston, USA) at different shear rates. Thus, plastic viscosity PV is obtained as the difference in shear stress at 600 and 300 rounds per minute, and the yield point YP as the difference between the PV and the shear stress at 300 revolutions per minute. The respective yield point is however always proportional to the carrying capacity of a drilling fluid. However, it should be noted that a high plastic viscosity results in only a small rate of penetration. A typical shear-thinning rheology is characterized by low PV and high YP values.

According to the prior art to date, MMH/clay, MMS/clay and biopolymer drilling fluids are not suitable for high-temperature applications at >300° F. (>149° C). Biopolymers lose their activity at the latest at about 280° F. (about 138° C.). High-quality AHMMO compounds, too, are limited to temperatures of use of up to and including about 300° F. (about 149° C.).

It was thus the object of the present invention to provide a method for the rheology control of fluid phases and suitable compositions therefor, which are suitable both for water-based and for oil-based systems and cover a wide temperature range.

This object was achieved by a method in which adducts of layered mixed metal hydroxides (MMH) and smectite clays are used as rheology control compositions, a hectorite being at least partly used as the smectite clay. Hectorite is a material having the approximate composition $Na_{0.33}$ $(Mg, Li)_3[Si_4O_{10}](OH, F)_2$, optionally without Li and/or F. The hectorite structure derived from the prototype talc is described, for example, in Ullmann's Encyclopaedia of Industrial Chemistry, $5^{th}$ Edition, Vol. A7, pages 110–111. The proportion of hectorite in the total amount of smectite clay is preferably at least 20% by weight and particularly preferably at least 50% by weight.

Surprisingly, it has been found that, with the method according to the invention, the corresponding composition, not only is the desired broad field of use as a rheology control composition in both water-based and oil-based fluid phases covered but also reliable rheology control is permitted in high-temperature applications. These advantages were not to be expected on the basis of the experience to date with smectite clays.

MMH components which have proven suitable for the present method and the adducts used therein are those which have in particular the formula (I):

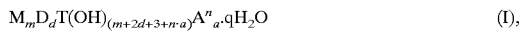

in which
M=at least one monovalent metal ion,
m=0 to 1,
D=at least one divalent metal ion,
d 0 to 6,
T=at least one trivalent metal ion,
A=at least one monovalent or polyvalent anion which differs from $OH^-$,
a=number of anions A,
n=valency of the anions A (and hence a negative number),
$n·a \leq 0$,
(m+d) >0,
$q \geq 0$
and
$(m+2d+3+n·a) \geq 2$.

The compound (I) may contain a trivalent cation T but also different trivalent cations T, e.g. $Al^{3+}$ and $Fe^{3+}$, whose stoichiometry sums to T. The symbols m, d and a may denote both integers and fractions. Owing to the "open" layer structures of the mixed metal hydroxides, it is usually not possible to state a preferred range for the number q of water molecules.

Particularly preferably used mixed metal hydroxides are those of the formula (II)

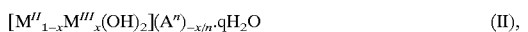

in which
$M^{II}$=Ca, Mg, Zn, Cu, Ba, Sr, Fe, Ni, Mn and/or Co,
$M^{III}$=Al, Fe, Co, Ni, Mn, Cr and/or Ga, A=monovalent and/or polyvalent anions having the valency n<0 and preferably hydroxide, halide, sulfate, nitrate, carbonate, silicate, phosphate and/or borate,
x=0.2 to 0.5,
$q \geq 0$.

Specific fields of use may necessitate the use of specially prepared MMH, which the present invention also envisages, and for which MMH which were produced by hydration of mixed metal oxides and/or mixed metal hydroxides, which may in turn be thermally activated, are used.

It is advisable to use, as precursors of the mixed metal hydroxides activated hydrotalcites of the general formula (III)

in which
x=0 to 1,
y=0 to 1.5,
z=0 to 3, with
x=2y+z-2,
which can be activated by the action of heat. For this activation, in general temperatures of from 400 to 700° C. are sufficient for converting the metal compounds into their correspondingly dehydrated oxide or oxyhydroxide form (MMO) by expulsion of water and/or $CO_2$.

According to the present invention, it is however also possible to use, in addition to the MMH described above, which were produced from MMO, also those mixed metal hydroxides which are referred to as so-called coprecipitates and in general have the formula (IV)

in which y=0 to 2 and
q=an unspecific number of molecules of water of hydration.

Owing to the "open" layer structures of the coprecipitates, it is usually not possible to state a preferred range for the number q of water molecules.

In this case of the coprecipitates, too, it is possible to use MMH forms which have been thermally activated beforehand.

The abovementioned wide range of use of the method according to the invention is additionally documented by the fact that the adducts used according to the method may also contain mixed metal hydroxides which are not added as such to the fluid phase but are formed in situ, which is particularly preferably effected by using the starting compounds which contain the respective components $M^{II}$ and $M^{III}$ in salt or oxide form, or any desired mixtures thereof, such as $Mg^{II}O/NaAl^{III}O_2$, in the corresponding amounts and optionally in the presence of a suitable base. The combination of $MgO/FeSO_4$, in which the iron ion passes through a valency change from II to III may be mentioned as a further example of a suitable mixture of components $M^{II}/M^{III}$.

A further important advantage of the method according to the invention is that the adducts used for this purpose preferably have an MMH/clay or hectorite ratio of from 0.01 to 1:1 and particularly preferably a ratio of from 0.05 to 0.2:1, based on weight, which once again illustrates the wide applicability of the method in numerous fluid phases having a very wide range of properties and compositions.

In this context, the method according to the invention also takes into account specific circumstances in which the addition of the MMH/hectorite adducts alone is no longer sufficient for influencing the fluid phase in the desired manner. In these cases, the MMH/hectorite adducts may then also be used together with other rheology control compounds, for example in particular water-soluble and/or water-swellable polymer compounds of natural and/or synthetic origin, the use of thermally stable polymer compounds being particularly preferred.

At this point, nonionic, weakly anionic, weakly cationic or zwitterionic polymers may be mentioned by way of example, which polymers, in contrast to highly anionic or cationic polymers, do not adversely affect the MMH/clay adduct formation, and the addition of which results in a reduction of filtrate water undesired in drilling technology. In particular, synthetic betaine-based copolymers and terpolymers are suitable.

In practice, it may also be necessary to change the proportion of hectorite in the adducts. The method according to the invention therefore also takes into account the variant of using adducts whose clay fraction contains up to 80% by weight of clays which differ from hectorite. All suitable clays, in particular of the smectite type, such as corresponding talc or pyrophyllite types, may be used for this purpose but in particular bentonite has proven a suitable second clay component in addition to hectorite.

As already mentioned several times and demonstrated by the variety described above, the method according to the invention is suitable for wide use for influencing the rheology in fluid phases. The method develops its positive properties particularly when combinations of MMH and hectorite or MMH/clay mixtures are used in drilling fluids.

Regarding the use in drilling fluids, it should be mentioned that the method is suitable in particular for applications in the high temperature range, and it is for this reason that the invention particularly recommends the use of adducts at temperatures >300° F., i.e. in regions >149° C.

In addition to the method for the rheology control of fluid phases, the present invention also relates to a composition which is particularly suitable for this purpose and which contains adducts of layered MMH and hectorite. In addition to hectorite, the composition may also contain further clays, so that the invention also relates to adducts whose clay fraction contains up to 80% by weight, preferably up to 50% by weight, of clays differing from hectorite, especially bentonite.

By means of the claimed method and the composition particularly suitable for this purpose, it has been possible in particular to improve the thermal stability of shear-thinning drilling fluids so that the rheologies of the fluid phase(s), as required, for example, in the exploitation of deep petroleum and natural gas deposits or in the drilling of geothermal wells, withstand thermal loads >300° F. (>149° C.) without problems.

The Examples which follow are intended to illustrate the advantages of the method according to the invention and of the composition according to the invention, in particular when they are used in the high temperature range.

EXAMPLES

The properties of the respective drilling fluids, consisting of water and further main components MMH+clay fraction were determined according to the specifications of the American Petroleum Institute (API), Guideline RP13B-1. Thus, the rheologies were measured using a corresponding FANN viscometer at 600 and 300 rounds per minute, from which the values for PV (plastic viscosity) and YP (yield point) are calculated. In addition, the shear stresses at 6 and 3 rounds per minute were determined. The dynamic aging of the drilling fluids was effected in each case for 16 hours in a roller oven and at the temperatures stated in the respective Examples. The drilling fluid rheologies were measured in each case after the preparation and after the aging (with subsequent cooling and further mixing).

Examples 1.1 to 1.3

Variation of the clay component

Example 1.1

Example 1.1 illustrates the resulting high-temperature stability of an MMH/hectorite additive used according to the invention compared with two MMH drilling fluids based on other smectite clays. For the reference drilling fluids, a talc smectite, vermiculite, which is related to hectorite, and a bentonite customary in drilling technology and having a high content of sodium montmorillonite were used. In each case POLYVIS® II from SKW Trostberg AG, Trostberg, Germany, was used as the MMH (AHMMO)-producing component.

Preparation of the Drilling Fluids 350 g of water were initially introduced into a Hamilton Beach Mixer (HBM), "low" speed, and stirred together with a) 8 g of bentone CT® (hectorite from Rheox, Leverkusen, Germany) or b) Wyoming bentonite or c) vermiculite (crude vermiculite, milled, from South Africa, from Mandoval, Godalming, UK) for 30 minutes. 0.8 g of mixed metal oxyhydroxide according to EP 539 582, Example 1, was then added. The pH was adjusted to values between 10.5 and 11 with base soda (0.5 g) or sodium hydroxide solution. Stirring was then carried out for a further 45 minutes, and the drilling fluids were subjected to dynamic aging, in each case in a closed sample cell for 16 hours at 250–500° F. The drilling fluids aged in this manner were mixed on the HBM for about 5 minutes.

Results:

TABLE 1

| Experiment | Measurement after | FANN rheology [600-300-6-3] | PV [cP] | YP [lbs/ 100 ft$^2$] |
|---|---|---|---|---|
| a) Hectorite | Mixing | 120-106-31-29 | 14 | 92 |
|  | 250° F./16 h | 129-120-38-32 | 9 | 111 |
|  | 300° F./16 h | 115-101-36-29 | 14 | 87 |
|  | 350° F./16 h | 147-120-42-36 | 27 | 93 |
|  | 500° F./16 h | 113-107-35-33 | 6 | 101 |
| b) Wyoming bentonite | Mixing | 120-108-33-31 | 12 | 96 |
|  | 250° F./16 h | 95-87-39-32 | 8 | 79 |
|  | 300° F./16 h | 73-67-30-25 | 6 | 61 |
|  | 350° F./16 h | 22-14-2-1 | 8 | 6 |
|  | 500° F./16 h | 9-6-1-1 | 3 | 3 |
| c) Vermiculite | Mixing | 4-2-1-1 | 2 | 0 |
|  | 500° F./16 h | 3-1-0-0 | 2 | — |

The results clearly show that the MMH/hectorite-based composition according to the invention has extremely high thermal stability up to and including 500° F. (260° C.). After aging at 350–500° F. (177–260° C.), the FANN rheologies and YP values of the aged drilling fluids are high in the systems a) containing hectorite compared with b) containing bentonite. When vermiculite is used, significant viscosities are obtained neither before nor after aging.

Example 1.2

This Example shows that different hectorite qualities have a thickening effect.

Preparation of the Drilling Fluids: 350 g of water were initially introduced into a Hamilton Beach Mixer (HBM), "low" speed, and stirred together with a) 5 g of Bentone MA® (high-purity hectorite from Rheox, Leverkusen, Germany), b) 5 g of Hectabrite DP® (high-purity hectorite from American Colloid Company, Arlington, USA) or c) 8 g of Laponite RD® (synthetic hectorite from Solvay Alkali, Rheinberg, Germany) for 30 minutes. 0.8 g of mixed metal oxyhydroxide according to EP 539 582, Example 1, was then added. Thereafter, the pH was adjusted to values between 10.5 and 11 with base soda (0.5 g) or sodium hydroxide solution and stirring was carried out for a further 45 minutes before the dynamic aging of the drilling fluid was effected, in each case in a closed sample cell for 16 hours at 350° F. The drilling fluids aged in this manner were further mixed on the HBM for about 5 minutes.

Results:

TABLE 2

| Experiment | Measurement after | FANN rheology [600-300-6-3] | PV [cP] | YP [lbs/100 ft$^2$] |
|---|---|---|---|---|
| a) High-purity hectorite I | Mixing | 124-108-33-28 | 16 | 92 |
| | 350° F./16 h | 101-97-26-25 | 4 | 93 |
| b) High-purity hectorite II | Mixing | 98-88-33-28 | 10 | 78 |
| | 350° F./16 h | 71-66-27-22 | 5 | 61 |
| c) Synthetic hectorite | Mixing | 73-70-42-40 | 3 | 67 |
| | 350° F./16 h | 67-63-54-54 | 4 | 59 |

Example 1.3

This Example shows the high thermal stability of MMH/hectorite composition according to the invention, based on a 1:1 mixture of hectorite and bentonite.

Preparation of the Drilling Fluids:

350 g of water were initially introduced into a Hamilton Beach Mixer (HBM), "low" speed, and stirred together with 4 g of Wyoming bentonite and 4 g of Bentone CT® (hectorite from Rheox, Leverkusen, Germany) for 30 minutes. Thereafter, 0.8 g of mixed metal oxyhydroxide according to EP 539 582, Example 1, was added and the pH was adjusted to values between 10.5 and 11 with a 20% strength sodium hydroxide solution. Thereafter, stirring was carried out for a further 45 minutes and the drilling fluids were subjected to dynamic aging in a closed sample cell for 16 hours at from 300 to 400° F. The drilling fluids aged in this manner were further mixed on the HBM for about 5 minutes.

Results:

TABLE 3

| Measurement after | FANN rheology [600-300-6-3] | PV [cP] | YP [lbs/100 ft$^2$] |
|---|---|---|---|
| Mixing | 117-108-38-31 | 9 | 99 |
| 300° F./16 h | 113-107-42-36 | 6 | 101 |
| 350° F./16 h | 97-84-38-31 | 13 | 71 |
| 400° F./16 h | 37-27-10-8 | 10 | 17 |

The result clearly shows that the admixing of conventional bentonite (50%) with hectorite permits rheologies stable to aging up to and including 350° F., which constitutes a substantial improvement compared with the conventional bentonite/MMH reference system from the prior art.

Examples 2.1 to 2.3

Combination of MMH/hectorite+further additives

Example 2.1

This Example combines an MMH/hectorite composition according to the invention with various additives customary in drilling technology or with contaminating substances. These include polymeric additives for fluid loss control, weighting material and lubricants, which can usually be added to the base drilling fluid depending on the specific drilling problems. Contamination with, for example, hardened, ground cement usually occurs during milling work in the drilled hole. The additives added in the Example generally have a more or less disadvantageous effect on the thermal stability of the bentonite/MMH drilling fluids commonly used according to the prior art.

Preparation of the Drilling Fluids:

350 g of water were initially introduced into a Hamilton Beach Mixer (HBM), "low" speed, and stirred together with 8 g of bentone CT® (hectorite from Rheox, Leverkusen, Germany) for 30 minutes. Thereafter, 0.8 g of mixed metal oxyhydroxide according to EP 539 582, Example 1, was added and the pH was adjusted to values between 10.5 and 11 with base soda (0.5 g) or sodium hydroxide solution. Stirring was then carried out for a further 45 minutes. 5 g of POLYTROL®, a nonionic polymer from SKW Trostberg AG, Trostberg, Germany a), 500 g of barium sulfate b), 300 g of calcium carbonate c), 5 g of polypropylene glycol (VORANOL® P3000, MW: about 3000, from Dow Germany Inc., Schwalbach, Germany) d), 5 g of biodegradable soya/fish oil mixture e) or 15 g of hardened, ground cement and 2 g of sodium bicarbonate for readjusting the pH f) were finally added as additional additives or contaminating substances, and the respective fluid phases were stirred for 10 minutes, after which the dynamic aging of the drilling fluids was effected, in each case in a closed sample cell for 16 hours at 350° F. The drilling fluids aged in this manner were further mixed on the HBM for about 5 minutes.

Results:

TABLE 4

| Experiment | Experiment after | FANN rheology [600-300-6-3] | PV [cP] | YP [lbs/100 ft$^2$] | Miscellaneous |
|---|---|---|---|---|---|
| a) Filtrate reducer: nonionic polymer | Mixing | 147-127-59-54 | 20 | 107 | Filtrate water loss after API: 7 ml |
| | 350° F./16 h | 132-112-40-33 | 20 | 92 | |
| b) Weighting material: BaSO$_4$ | Mixing | 114-92-34-27 | 22 | 70 | Density: 1.84 g/ml |
| | 350° F./16 h | 82-70-46-42 | 10 | 62 | |
| c) Weighting material: CaCO$_3$ | Mixing | 125-94-55-35 | 31 | 63 | Density: 1.54 g/ml |
| | 350° F./16 h | 120-92-50-33 | 28 | 64 | |
| d) Lubricant: polypropylene glycol | Mixing | 125-108-34-32 | 17 | 91 | |
| | 350° F./16 h | 118-103-33-30 | 15 | 88 | |
| e) Lubricant: soya/fish oil mixture | Mixing | 121-112-34-27 | 9 | 103 | |
| | 350° F./16 h | 109-102-32-28 | 7 | 95 | |
| f) Cement | Mixing | 107-93-25-20 | 14 | 79 | |
| | 350° F./16 h | 99-92-27-25 | 7 | 85 | |

The results show that the disadvantageous effects of the additives a) to f), known from the prior art, do not have adversely affect the use of the MMH/hectorite additive according to the invention, and the hectorite/MMH additives ensure very high thermal stability.

Example 2.2

This Example relates to the MMH/hectorite composition according to the invention in drilling fluids having a high content of KCl or NaCl.

Preparation of the Drilling Fluids:

350 g of water were initially introduced into a Hamilton Beach Mixer (HBM), "low" speed, and stirred together with 14 g of Bentone CT® (hectorite from Rheox, Leverkusen, Germany) for 30 minutes. 1.4 g of mixed metal oxyhydroxide according to EP 539 582, Example 1, were then added. The pH was adjusted to values between 10.5 and 11 with base soda (0.5 g) or sodium hydroxide solution and stirring was then carried out for a further 30 minutes. Thereafter, 20 g each of NaCl a) and KCl b) were added and stirring was carried out for 10 minutes. The dynamic aging of the drilling fluids was effected in each case in a closed sample cell for 16 hours at 350° F., before the drilling fluids aged in this manner were further mixed in the HBM for about 5 minutes.

Results:

TABLE 5

| Experiment | Measurement after | FANN rheology [600-300-6-3] | PV [cP] | YP [lbs/ 100 ft$^2$9] |
|---|---|---|---|---|
| a) NaCl | Mixing | 90-78-24-21 | 12 | 66 |
|  | 350° F./16 h | 88-79-23-20 | 9 | 70 |
| b) KCl | Mixing | 76-68-27-24 | 8 | 60 |
|  | 350° F./16 h | 129-104-28-27 | 25 | 79 |

Example 2.3

This Example describes the effect of an MMH/hectorite composition according to the invention in sea water. The corresponding viscosity was increased before the addition of the sea water to fresh water, which is the usual procedure in the case of MMH-based drilling fluids and ensures optimum rheology.

Preparation of the Drilling Fluids:

350 g of water were initially introduced into a Hamilton Beach Mixer (HBM), "low" speed, and stirred together with 16 g of Bentone CT® (hectorite from Rheox, Leverkusen, Germany) for 30 minutes. 1.6 g of mixed metal oxyhydroxide according to EP 539 582, Example 1, were then added. The pH was adjusted to values between 10.5 and 11 with base soda (0.5 g) or sodium hydroxide solution and stirring was carried out for a further 30 minutes. Thereafter, the drilling fluid was diluted with sea water (14 g of sea water according to DIN 50900 per 350 g of water) in the ratio 1:1 and the pH was adjusted by adding at least 1.5 g of sodium carbonate and, if required, sodium hydroxide solution. This mixture was stirred for 10 minutes before the dynamic aging of the drilling fluid was effected in a closed sample cell at 350° F. This drilling fluid aged in this manner was further mixed on the HBM for about 5 minutes.

Results:

TABLE 6

| Measurement after | FANN rheology [600-300-6-3] | PV [cP] | YP [lbs/100 ft$^2$] |
|---|---|---|---|
| Mixing | 114-104-46-42 | 10 | 94 |
| 300° F./16 h | 124-104-34-31 | 20 | 84 |

Examples 3.1 to 3.4

Variation of the MMH component

The following Examples 3.1 to 3.4 show that MMH types differing according to the invention or MMH-producing starting compounds can be used for adduct formation with hectorite.

Example 3.1

This Example uses a dry blend having a long shelf life and comprising an MMH (AHMMO)-producing component and sodium carbonate. The base obtained makes an additional pH adjustment superfluous. The high-temperature stability was determined at 400° F. (204° C.). A hectorite drilling fluid without MMH served as a reference example.

Preparation of the Drilling Fluids:

350 g of water were initially introduced into a Hamilton Beach Mixer (HBM), "low" speed, and stirred together with 8 g of Bentone CT® (hectorite from Rheox, Leverkusen, Germany) for 30 minutes. Thereafter, 1.0 g of a POLYVIS® II/sodium carbonate ready-mix from SKW Trostberg AG a) or 1.0 g of sodium carbonate b) was added and stirring was carried out for a further 45 minutes. The dynamic aging of the drilling fluids was effected in each case in a closed sample cell for 16 hours at 400° F. These drilling fluids aged in this manner were further mixed in the HBM for about 5 minutes.

Results:

TABLE 7

| Experiment | Measurement after | FANN rheology [600-300-6-3] | PV [cP] | YP [lbs/ 100 ft$^2$9] |
|---|---|---|---|---|
| a) MMH/sodium carbonate ready-mix | Mixing | 104-92-30-26 | 12 | 80 |
|  | 400° F./16 h | 90-84-25-20 | 6 | 78 |
| b) without MMH; only sodium carbonate | Mixing | 14-11-6-6 | 3 | 8 |
|  | 400° F./16 h | 12-8-1-1 | 4 | 4 |

Example 3.2

A coprecipitated MMH of the general empirical formula $MgAl(OH)_{5-x}Cl_x$ was combined with an initially introduced hectorite suspension, with the result that an MMH/hectorite adduct according to the invention was obtained. Furthermore, a thermally activated coprecipitate (cop.) was used, so that smaller doses of clay and MMH were required compared with the unactivated material.

The thermal stability of the hectorite-based drilling fluids a) and b) according to the invention is demonstrated below in comparison with the bentonite-based systems c) and d). Vermiculite drilling fluids d) and f) to which coprecipitated MMH or activated coprecipitate had been added served as a further reference.

Preparation of the Drilling Fluids:

350 g of water were initially introduced into a Hamilton Beach Mixer (HBM), "low" speed, and stirred together with Bentone CT® (hectorite from Rheox) (a: 14 g; b: 8 g) or 8 g of Wyoming bentonite c), d) or 14 g of vermiculite e), f) for 30 minutes. Unactivated precipitate according to EP 207 810, Example 1 (a: 1.4 g; c: 0.8 g; e: 1.4 g) or thermally activated coprecipitate according to EP 539 582, Example 3 (b: 0.8 g; d: 0.8 g; f: 1.4 g) was then added. The pH was adjusted to values between 11 and 12 with sodium hydroxide solution. In the sub-examples b) and d), the pH was adjusted to values between 10.5 and 11.5 with base soda or sodium hydroxide solution. Stirring was then carried out for a further 45 minutes before the dynamic aging of the drilling fluids was effected in each case in closed sample cells for 16 hours at 350° F. These drilling fluids aged in this manner were further mixed in the HBM for about 5 minutes.

Results:

TABLE 8

| Experiment | Measurement after | FANN rheology [600-300-6-3] | PV [cP] | YP [lbs/ 100 ft²9] |
|---|---|---|---|---|
| a) Hectorite/cop. MMH | Mixing | 91-81-55-53 | 10 | 71 |
|  | 350° F./16 h | 91-84-68-62 | 7 | 77 |
| b) Hectorite/act. cop. MMH | Mixing | 117-98-32-23 | 19 | 79 |
|  | 350° F./16 h | 104-93-27-23 | 11 | 82 |
| c) Bentonite/cop. MMH | Mixing | 124-114-55-49 | 10 | 104 |
|  | 350° F./16 h | 34-24-3-2 | 10 | 14 |
| d) Bentonite/act, cop. MMH | Mixing | 134-120-40-37 | 14 | 106 |
|  | 350° F./16 h | 39-30-15-13 | 9 | 21 |
| e) Vermiculite/ cop. MMH | Mixing | 4-3-1-1 | 1 | 2 |
|  | 350° F./16 h | 3-2-0-0 | 1 | 1 |
| f) Vermiculite/ act. cop. MMH | Mixing | 5-3-2-1 | 2 | 1 |
|  | 350° F./16 h | 4-3-1-0 | 1 | 2 |

Example 3.3

This Example shows the thickening effect of a mixture of $NaAlO_2$ and MgO on an initially introduced hectorite suspension. By means of MMH produced in situ, an MMH/hectorite adduct forms according to the invention. The thermal stabilities of the hectorite-based drilling fluid and of a bentonite or vermiculite suspension thickened with $NaAlO_2$/MgO are demonstrated at 250° F. (121° C.).

Preparation of the Drilling Fluids:

350 g of water were initially introduced into a Hamilton Beach Mixer (HBM), "low" speed, and stirred together with 10 g of Bentone CT® (hectorite from Rheox) a) or 8 g of Wyoming bentonite b) or 10 g of vermiculite c) for 30 minutes. 1.0 g (a, c) or 0.8 g (b) of Drill Out® ($NaAlO_2$/MgO-containing product from Drilling Specialities, Bartlesville, USA) was then added. Stirring was carried out for a further 45 minutes before the dynamic aging of the drilling fluids was effected in each case in closed sample cells for 16 hours at 250° F. These drilling fluids aged in this manner were further stirred on the HBM for about 5 minutes.

Results:

TABLE 9

| Experiment | Measurement after | FANN rheology [600-300-6-3] | PV [cP] | YP [lbs/ 100 ft²9] |
|---|---|---|---|---|
| a) Hectorite/ $NaAlO_2$ + MgO | Mixing | 109-98-35-30 | 11 | 87 |
|  | 250° F./16 h | 117-106-34-30 | 11 | 95 |
| b) Wyoming Bentonite/ $NaAlO_2$ + MgO | Mixing | 127-107-30-19 | 20 | 87 |
|  | 250° F./16 h | 18-11-3-2 | 7 | 4 |
| c) Vermiculite/ $NaAlO_2$ + MgO | Mixing | 4-2-1-0 | 2 | 0 |
|  | 250° F./16 h | 2-1-0-0 | 1 | 1 |

The Example clearly shows that an improvement in the thermal stability of drilling fluids containing MMH produced in situ is achieved by the use, according to the invention, of hectorite.

Example 3.4

This Example describes the use of MMH compounds having a layer structure in combination with hectorite in comparison with the MMS/hectorite adducts described in WO 94/02 566. MMSs (mixed metal silicates) are MMH compounds having a three-dimensional network structure.

Preparation of the Drilling Fluids:

350 g of water were initially introduced into a Hamilton Beach Mixer (HBM), "low" speed, and stirred together with 14 g of Bentone CT® (hectorite from Rheox, Leverkusen, Germany) for 30 minutes. 1.4 g of katoite-based mixed metal silicate according to WO 94/02 566 were then added. Stirring was then carried out for 45 minutes before the dynamic aging of the drilling fluid was effected in closed sample cells for 16 hours at 250° F. The drilling fluids aged in this manner were further mixed on the HBM for 5 minutes.

Results:

TABLE 10

| Experiment | Measurement after | FANN rheology [600-300-6-3] | PV [cP] | YP [lbs/ 100 ft²9] |
|---|---|---|---|---|
| a) Hectorite/MMS | Mixing | 86-80-45-40 | 6 | 74 |
|  | 250° F./16 h | 12-8-2-2 | 4 | 4 |

The Example shows that the thermal stability (<250° F., 121° C.) achieved with MMS and hectorite do not reach the usual requirements for high-temperature applications. In addition, the MMS requires very high doses of hectorite in order to establish the desired viscosity.

What is claimed is:

1. A method for the rheology control of a fluid, comprising adding an adduct comprising a layered mixed metal hydroxide (MMH) and hectorite to a fluid.

2. The method as claimed in claim 1 wherein said mixed metal hydroxide is of formula (I)

$$M_m D_d T(OH)_{(m+2d+3+n \cdot a)} A^n{}_a \cdot qH_2O \qquad (I),$$

wherein

M is at least one monovalent metal ion, m is 0 to 1;

D is at least one divalent metal ion;

d is 0 to 6;

T is at least one trivalent metal ion;

A is at least one monovalent or polyvalent anion, except A is not OH;

a is the number of anions A;

n is the valency of anion A;

n·a is less than or equal to 0;

(m+d) is greater than 0;

q is greater than or equal to 0; and (m+2d+3+n·a) is greater than or equal to 2.

3. The method of claim 2, wherein said mixed metal hydroxide is of the formula (II)

$$[M^{II}{}_{1-x}M^{III}{}_x(OH)_2](A^n)_{-x/n} \cdot qH_2O \qquad (II),$$

wherein $M^{II}$ is at least one divalent metal ion selected from the group consisting of Ca, Mg, Zn, Cu, Ba, Sr, Fe, Ni, Mn and Co; $M^{III}$ is at least one trivalent metal ion selected from the group consisting of Al, Fe, Co, Ni, Mn, Cr and Ga;

A is at least one member selected from monovalent anions and polyvalent anions having a valency n<0;

x is 0.2 to 0.5; and q is greater than or equal to zero.

4. The method of claim 1, wherein said mixed metal hydroxide is produced by hydration of at least one member selected from the group consisting of mixed metal oxide and mixed metal oxyhydroxide.

5. The method as claimed in claim 4, wherein said mixed metal hydroxide is an activated hydrotalcite of the formula (II)

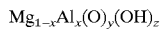 (III)

wherein x is 0 to 1;

y is 0 to 1.5;

z=0 to 3; and x=2y+z−2.

6. The method of claim 1, wherein said mixed metal hydroxide is a coprecipitate of formula (IV):

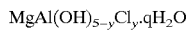 (IV)

wherein y is 0 to 2; and q is the number of molecules of water of hydration.

7. The method of claim 1, wherein said mixed metal hydroxide is produced in situ.

8. The method of claim 7, wherein said mixed metalhydroxide is produced by combining compounds containing the respective components $M^{II}$ and $M^{III}$ in salt or oxide form or mixtures thereof optionally in the presence of a suitable base.

9. The method of claim 1, wherein the ratio of mixed metal hydroxide to hectorite is from 0.01:1 to 1:1 by weight.

10. The method of claim 1, further comprising adding at least one polymer selected from the group consisting of a water-soluble polymer and water-swellable polymer of natural or synthetic origin to said adduct.

11. The method of claim 1, wherein said adduct further comprises up to 80% by weight of an additional clay that is not hectorite.

12. The method of claim 11, wherein said additional clay is bentonite.

13. The method of claim 1, wherein said fluid is a drilling fluid.

14. The method of claim 1, wherein the adducts fluid mixture is used in a drilling well having a temperature of greater than 149° C.

15. The method of claim 14, wherein said mixed metal oxide or mixed metal oxyhydroxide is thermally activated.

16. An adduct comprising a layered mixed metal hydroxide and a clay fraction comprising hectorite.

17. The adduct of claim 10, wherein said adduct comprises up to 80% by weight of an additional clay, wherein said additional clay is not hectorite.

18. The composition of claim 17, wherein said additional clay is bentonite.

19. A method of preparing the adduct of claim 16 comprising adding a layered mixed metal hydroxide to a clay fraction comprising hectorite.

20. The method of claim 6, wherein said mixed metal hydroxide is thermally activated.

* * * * *